(12) United States Patent
Takegawa et al.

(10) Patent No.: US 11,043,196 B2
(45) Date of Patent: *Jun. 22, 2021

(54) SUPPORTER FOR KICK PAD

(71) Applicant: Pearl Musical Instrument Co., Yachiyo (JP)

(72) Inventors: Akito Takegawa, Yachiyo (JP); Yuichi Sato, Chiba (JP)

(73) Assignee: Pearl Musical Instrument Co.

( * ) Notice: Subject to any disclaimer, the term of this patent is extended or adjusted under 35 U.S.C. 154(b) by 0 days.

This patent is subject to a terminal disclaimer.

(21) Appl. No.: 16/242,426

(22) Filed: Jan. 8, 2019

(65) Prior Publication Data
US 2019/0213985 A1  Jul. 11, 2019

(30) Foreign Application Priority Data
Jan. 9, 2018  (JP) .............................. JP2018-001183

(51) Int. Cl.
| G10D 13/02 | (2020.01) |
| G10H 3/14 | (2006.01) |
| G10D 13/10 | (2020.01) |
| G10D 13/11 | (2020.01) |
| F16M 13/02 | (2006.01) |

(52) U.S. Cl.
CPC ............. *G10D 13/02* (2013.01); *G10D 13/11* (2020.02); *G10D 13/26* (2020.02); *G10D 13/28* (2020.02); *G10H 3/146* (2013.01); *F16M 13/022* (2013.01)

(58) Field of Classification Search
CPC .. G10D 13/026; G10D 13/006; G10D 13/024; F16M 13/022; G10H 3/146
See application file for complete search history.

(56) References Cited

U.S. PATENT DOCUMENTS

| 8,178,769 | B2* | 5/2012 | Steele | ................... | G10D 13/28 |
| | | | | | 84/421 |
| 9,196,237 | B2* | 11/2015 | Kanayama | ............. | G10H 3/146 |
| 2008/0264233 | A1* | 10/2008 | Gatzen | .................. | G10D 13/14 |
| | | | | | 84/411 M |
| 2014/0260920 | A1* | 9/2014 | Kanayama | ............. | G10H 3/146 |
| | | | | | 84/730 |

FOREIGN PATENT DOCUMENTS

JP  2007-206633 A  8/2007

OTHER PUBLICATIONS

U.S. Appl. No. 16/242,301, filed Jan. 8, 2019, Takashi Koizumi.

* cited by examiner

*Primary Examiner* — Kimberly R Lockett
(74) *Attorney, Agent, or Firm* — Harness, Dickey & Pierce, P.L.C.

(57) ABSTRACT

A supporter (10) attaches a kick pad to be beaten with a beater to a stand installed on a floor surface. The supporter (10) includes an elastic member (1) that fixes the kick pad to one end as viewed in a direction intersecting with a direction in which the kick pad is beaten with the beater, and that fixes the other end as viewed in the intersecting direction to the stand.

12 Claims, 5 Drawing Sheets

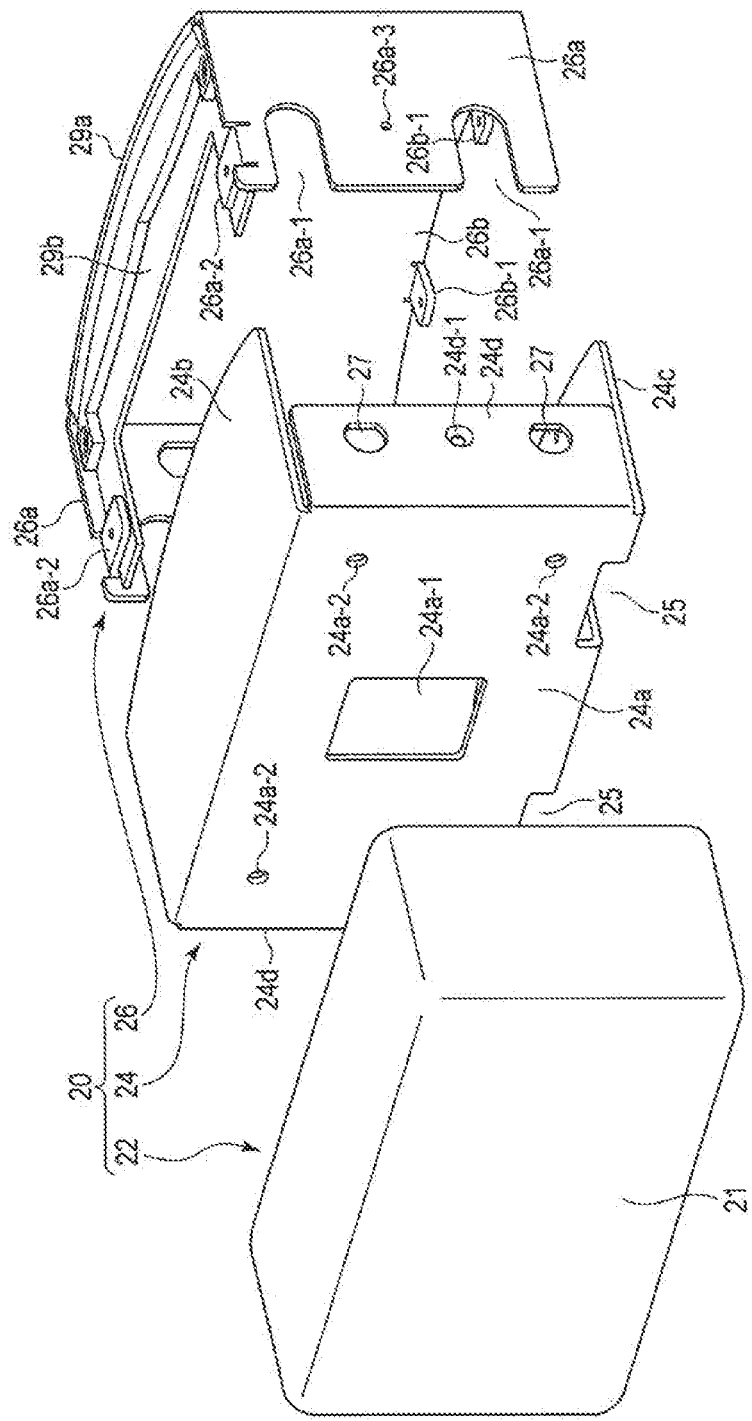
F I G. 2

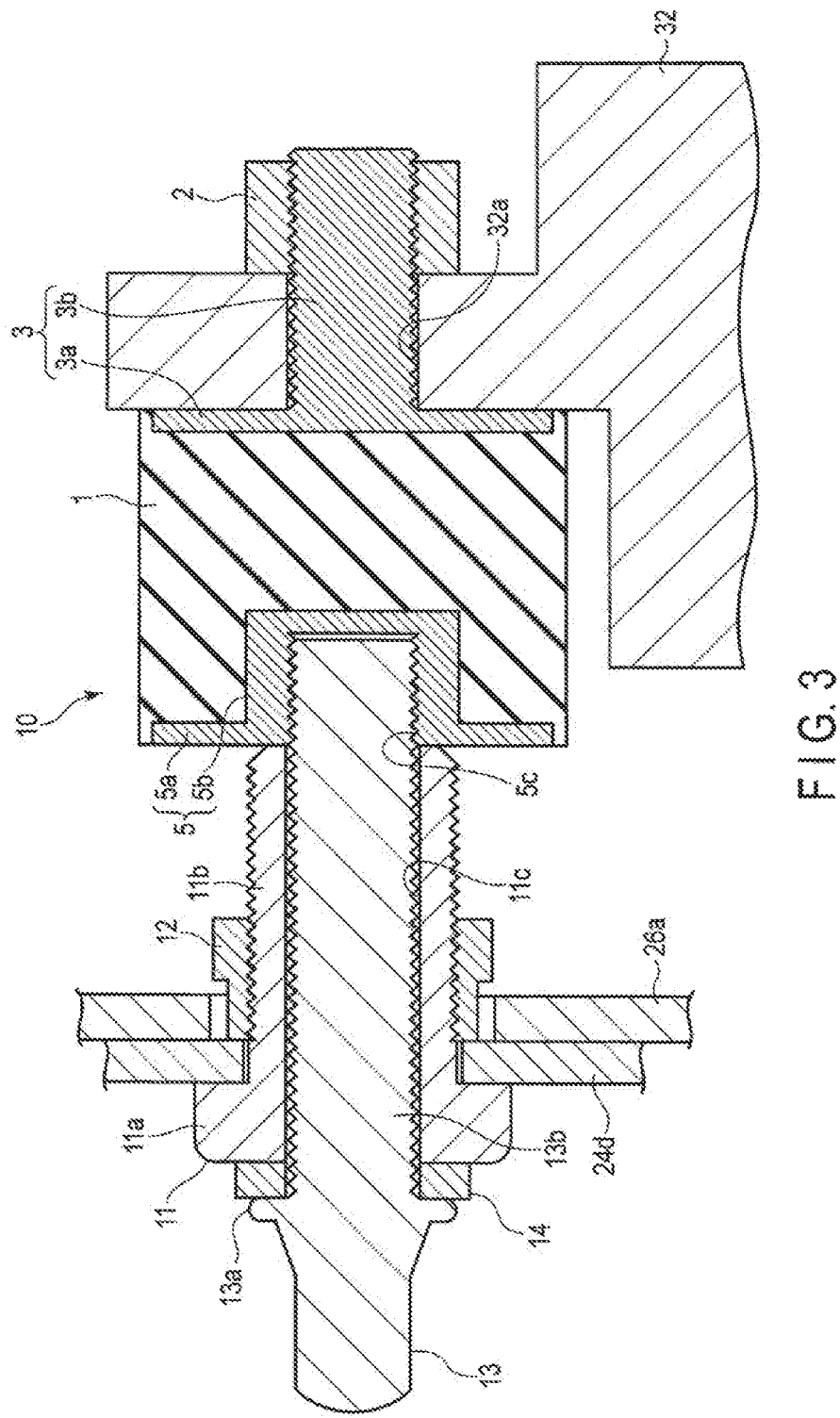
F I G. 3

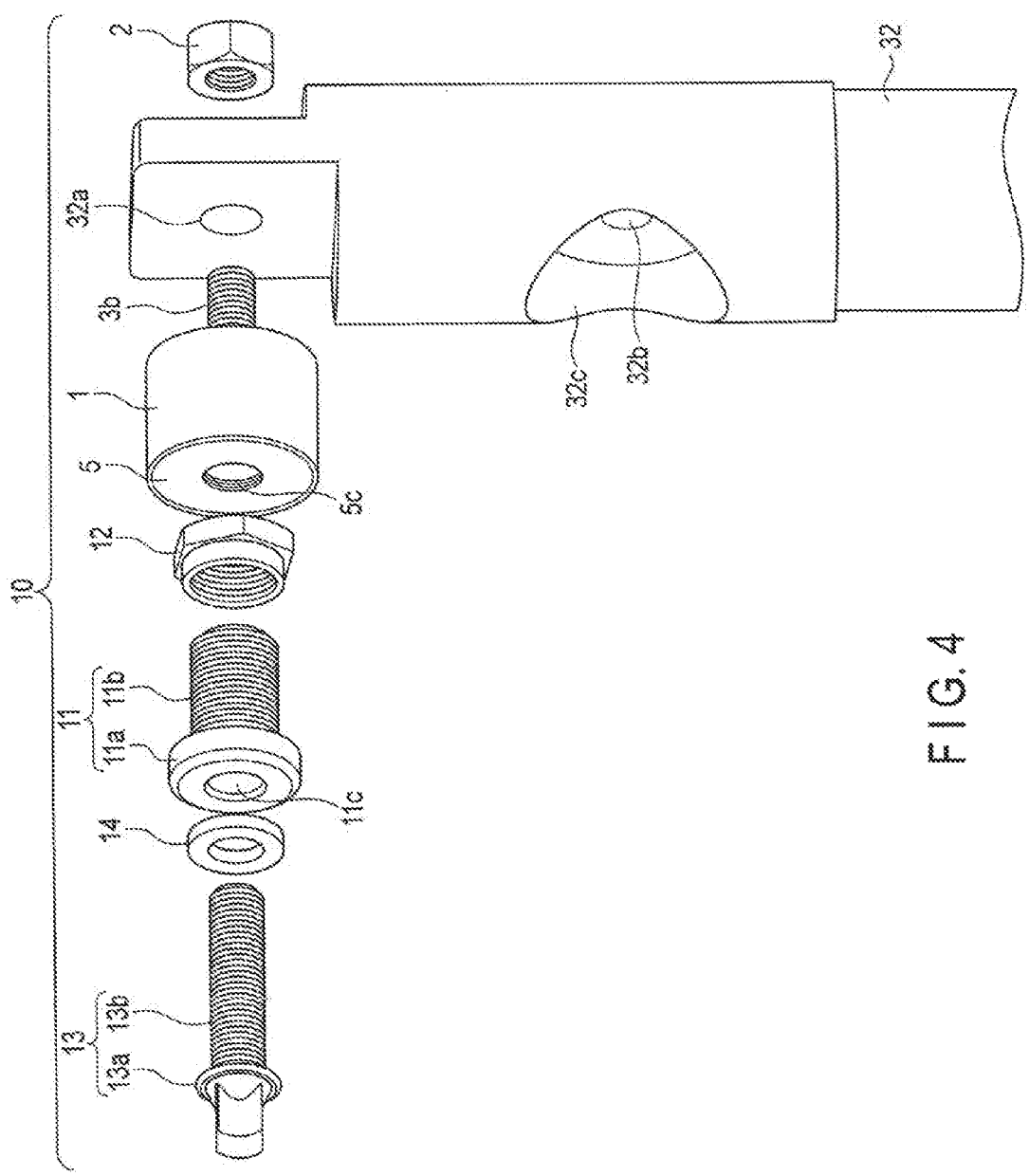
F I G. 4

SUPPORTER FOR KICK PAD

CROSS-REFERENCE TO RELATED APPLICATIONS

This application is based upon and claims the benefit of priority from Japanese Patent Application No. 2018-001183, filed Jan. 9, 2018; the entire contents of which are incorporated herein by reference.

BACKGROUND

1. Field

The present invention relates to, for example, a supporter that supports a kick pad of an electronic drum.

2. Description of the Related Art

A kick pad of an electronic drum is mounted on a stand, for example, when used. A foot pedal is fixed to a lower end of the stand. When such an electronic drum is played, the foot pedal is operated with the foot, causing the beater to be struck against the kick pad. The stand and/or the foot pedal includes a stopper pin. The stopper pin is stuck in a vibration-proof mat put on a floor to prevent slipping.

In an apparatus in which a kick pad is merely mounted on a stand, it is difficult to obtain a natural rebound as can be obtained by an acoustic drum, when the kick pad is beaten with a beater. When the impact of the beater is absorbed by using flexure of the stand or by increasing the elasticity of the kick pad itself in an attempt to make the striking sound quieter, the pressing of the kick pad causes the striking surface to move, making it difficult to obtain a natural rebound.

In contrast, when the kick pad is fixed to a stand with an increased stiffness, a striking sensation close to that of an acoustic drum can be achieved. However, the striking sound of the beater becomes louder accordingly, resulting in the problem of noise. Such a problem of the striking sound exists even when the stiffness of the kick pad itself is increased, making it difficult to achieve both quietness and a natural rebound.

SUMMARY

It is an object of the present invention to provide a supporter for a kick pad that provides excellent quietness and a natural rebound.

To achieve the above-described object, the supporter for the kick pad according to an embodiment of the present invention, which is a supporter configured to mount a kick pad to be beaten with a beater on a stand installed on a floor surface, includes an elastic member that fixes the kick pad to one end as viewed in a direction intersecting with a direction in which the kick pad is beaten with the beater, and that fixes the other end as viewed in the intersecting direction to the stand.

By using the supporter for the kick pad according to the present embodiment, it is possible to improve the quietness and to achieve a natural rebound.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is an exploded perspective view of the kick pad shown in FIG. 1;

FIG. 3 is a cross-sectional view showing the supporter of FIG. 1;

FIG. 4 is an exploded perspective view of the supporter shown in FIG. 3, and

DETAILED DESCRIPTION

Hereinafter, an embodiment of the present invention will be described with reference to the accompanying drawings.

Figure 1:
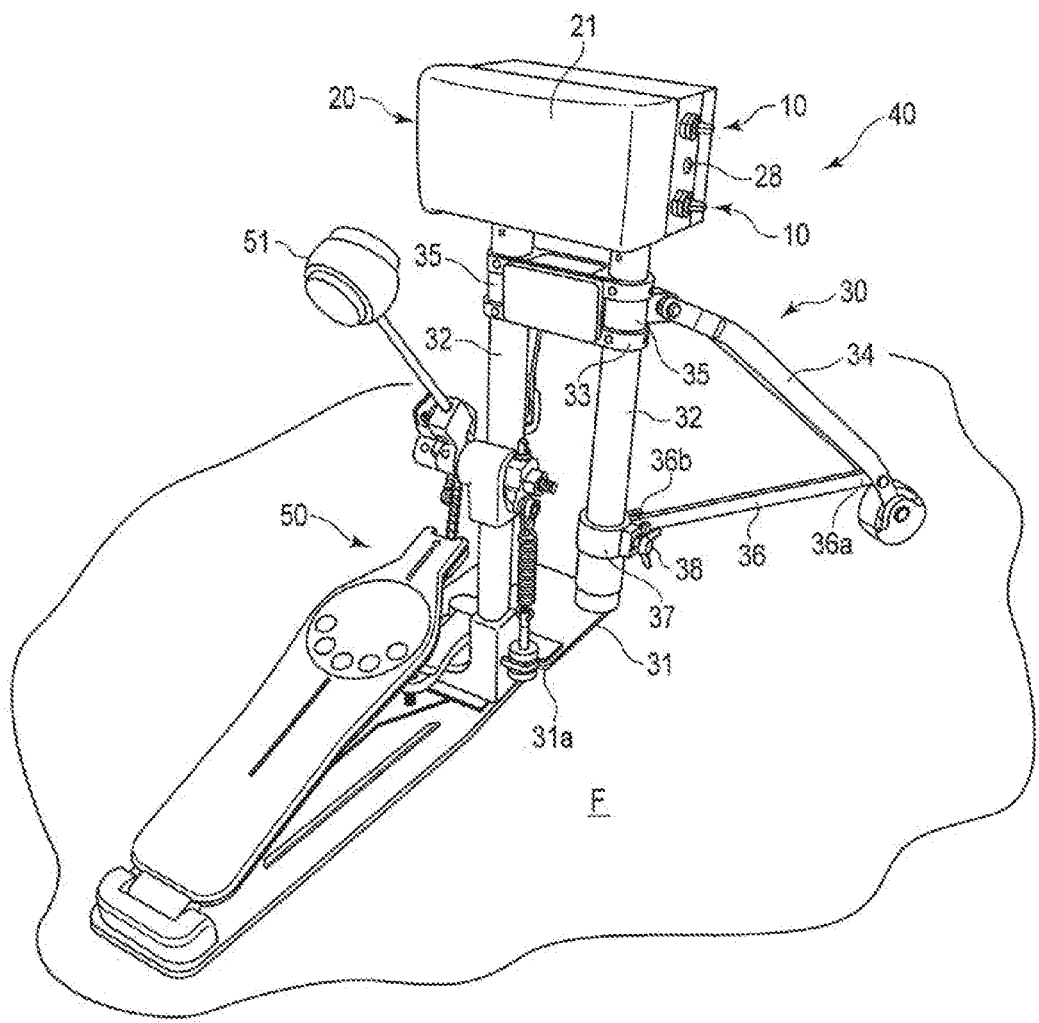
FIG. 1 is an external perspective view showing an assembly in which a kick pad is mounted on a stand via a supporter, according to an embodiment.
Figure 5:
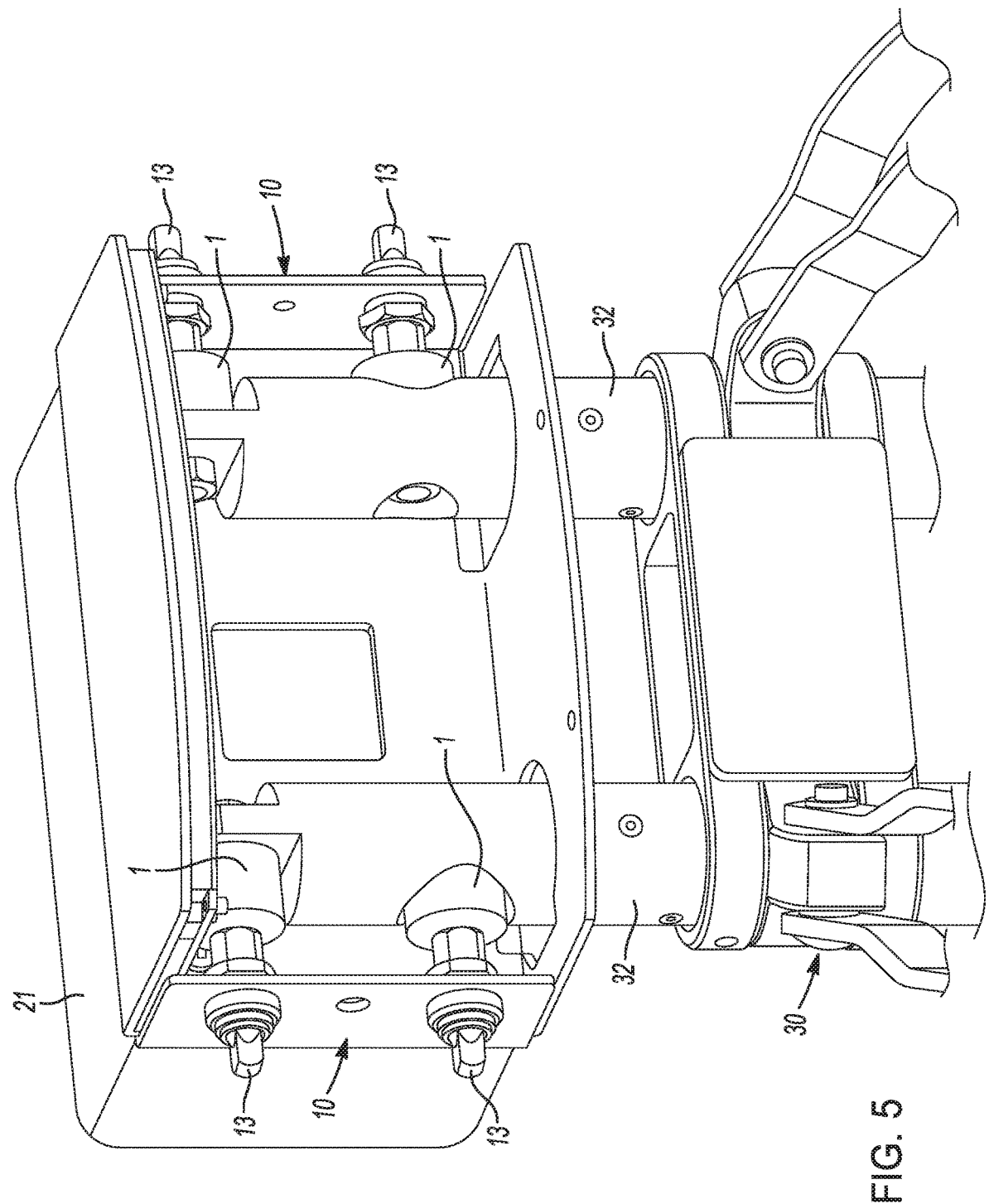
FIG. 5 is a partial perspective view as viewed from the rear of the kick pad with the rear cover removed.

FIG. 1 is an external perspective view showing an assembly 40 in which a kick pad 20 is mounted on a stand 30 via a plurality of (four in the present embodiment) supporters 10. FIG. 1 shows a state in which a foot pedal 50 is mounted on a bottom plate 31 of the stand 30. A front surface of the kick pad 20 corresponds to a head of a bass drum of an acoustic drum, and the bottom plate 31 of the stand corresponds to a hoop of the bass drum.

In the description that follows, the side of the foot pedal 50 of the assembly 40 will be referred to as a front side (or an anterior side) as viewed from the player, and the direction in which a beater 51 beats the kick pad 20 will be referred to as a back side (or a rear side). Since matters such as the configuration of the foot pedal 50 and the method of mounting the foot pedal 50 on the bottom plate 31 are well-known in the art, a detailed description of such matters will be omitted herein.

The stand 30 includes the bottom plate 31, which is formed of a substantially rectangular metal plate and on which the foot pedal 50 is mounted. The bottom plate 31 is arranged in parallel to a floor surface F, and respectively fixes lower ends of two main frames 32 to two corner portions on the back side of the upper surface of the bottom plate 31. The foot pedal 50 is attached to an edge portion 31a on the front side of the bottom plate 31, which is distanced from the lower ends of the main frames 32.

The two main frames 32 are formed of, for example, metal pipes, and extend upward from the bottom plate 31 substantially parallel to each other. The kick pad 20, which will be described later, is attached to upper ends of the two main frames 32.

A sub frame 33 is bridged between the two main frames 32. The sub frame 33 is formed of, for example, a metal plate. Supporting frames 34 are respectively provided on the back side of the main frames 32. Each of the supporting frames 34 has a configuration in which two elongated plates are joined at both ends thereof. Each of the supporting frames 34 is provided in such a manner that its upper end is rotatable around the corresponding main frame 32 via a rotatable sleeve 35, at a position where the sub frame 33 is connected.

At a lower end of each of the supporting frames 34, a stopper pin (not shown in the drawings), which is stuck in a vibration-proof mat (not shown in the drawings) put on the floor surface F and which is designed to prevent movement of the stand 30, is provided so as to protrude therefrom. A beam frame 36 is provided between a lower end of each of the supporting frames 34 and a lower end of the corresponding main frame 32. One end 36a of the beam frame 36 is rotatably attached to the supporting frame 34. A slidable sleeve 37 is rotatably attached to the other end 36b of the beam frame 36. The slidable sleeve 37 is attached so as to be slidable and rotatable around the main frame 32.

When the slidable sleeve 37 is slid upward along the main frame 32 from the state shown in FIG. 1, to make the other end 36b of the beam frame 36 close to an upper end of the supporting frame 34, the supporting frame 34 and the beam frame 36 will be made close to the state of being parallel to the main frame 32. That is, when the slidable sleeve 37 is slid to a position closest to the rotatable sleeve 35, the supporting frame 34 and the beam frame 36 will be substantially parallel to the main frame 32, and the stand 30 will be folded back.

When the stand 30 is unfolded to the state shown in FIG. 1 for use, a winged screw 38 is threadably fastened into the screw hole that penetrates the slidable sleeve 37, and the slidable sleeve 37 is fixed close to the lower end of the main frame 32. Thereby, the supporting frame 34 is fixed in an open state as shown in the drawing, and the stand 30 is stabilized. At this time, by changing the fixed position of the slidable sleeve 37 with respect to the main frame 32, the angle of the supporting frame 34 can be adjusted, thus allowing the tilt angle of the main frame 32 to be adjusted. That is, the angle at which the kick pad 20 is supported may be varied, as in the case of tilting a bass drum of an acoustic drum.

The two supporting frames 34 respectively connected to the two main frames 32 have a configuration capable of adjusting the opening angle as viewed in a direction distant from each other. That is, by rotating the rotatable sleeve 35 relative to the main frame 32 and rotating the slidable sleeve 37 relative to the main frame 32, the supporting frame 34 and the beam frame 36 can be rotated relative to the main frame 32, and the angle of the supporting frame 34 can be adjusted. This facilitates installation of the assembly 40 in a small space around the player's feet, thereby increasing the flexibility in layout. The angle-adjusted supporting frame 34 is fixed to the adjusted angle when the winged screw 38 is fastened.

FIG. 2 is an exploded perspective view of the kick pad 20.

The kick pad 20 includes a pad main body 22, a frame 24, and a rear cover 26 from the front side toward the back side.

The pad main body 22 includes, for example, a stack of a plurality of foamed sheets and sponge sheets (not shown in the drawings), and a metal plate (not shown in the drawings) including a piezoelectric element (not shown in the drawings) is arranged between the sheets of the stack. On a front surface side of the pad main body 22, a striking surface cover 21 that receives a strike of a beater 51 is provided. The striking surface cover 21 is provided to cover the surface on the front side (anterior surface) and all the side surfaces of the stack (not shown in the drawings), and is fixedly adhered to a rear surface plate (not shown in the drawings) at the surface (rear surface) on the back side of the stack 5. Thus, an anterior edge portion of the pad main body 22 is gently curved toward the side surfaces. The striking surface cover 21 is formed of, for example, vinyl chloride or a urethane sheet.

The frame 24 includes a fixation plate 24a, which contacts the rear surface of the pad main body 22 and which is fixedly screwed thereto. A top plate 24b, a bottom plate 24c, and two side plates 24d are continuously and integrally provided at the outer peripheral edge of the fixation plate 24a. The top plate 24b, the bottom plate 24c, and the two side plates 24d are bent toward the rear side, so as to be substantially orthogonal to the fixation plate 24a.

The fixation plate 24a includes, at a position opposite to the piezoelectric element (not shown in the drawings), an opening portion 24a-1, from which the wiring of the piezoelectric element is extracted. The fixation plate 24a includes four insertion holes 24a-2, through which the screws designed to fixedly fasten the pad main body 22 to the surface on the front side of the fixation plate 24a are inserted.

The bottom plate 24c of the frame 24 includes, at bent portions between the fixation plate 24a and the bottom plate 24c, two opening portions 25, through which the upper ends of the two main frames 32 of the stand 30 are inserted. The opening portions 25 are designed to have a size that does not allow the main frame 32 to contact the frame 24 of the kick pad 20 when the kick pad 20 is mounted on the stand 30.

The two side plates 24d respectively include attachment holes 27 designed to attach two supporters 10. Also, each of the side plates 24d includes an insertion hole 24d-1, through which a screw 28 (FIG. 1) designed to fix the corresponding side plate 26a of the rear cover 26 is inserted.

The rear cover 26 includes two side plates 26a, which are respectively arranged inside the side plates 24d of the frame 24. The side plates 26a are integrally provided so as to be bent toward the front side from both ends of a rear plate 26b as viewed in the horizontal direction.

Each side plate 26a has two notches 26a-1, which are respectively aligned with the two attachment holes 27 provided in the corresponding side plate 24d of the frame 24. The notches 26a-1 are designed to have a size (a length and a width) that does not interfere with the supporters 10 fitted into the attachment holes 27. A supporting piece 26a-2, which is bent inwards along the top plate 24b of the frame 24, is provided at an upper edge of each side plate 26a. Each side plate 26a has a screw hole 26a-3, which is aligned with the insertion hole 24d-1 provided in the side plates 24d of the frame 24.

When the rear cover 26 is attached to the frame 24, the two side plates 26a of the rear cover 26 are stacked on the inside of the two side plates 24d of the frame 24, and a screw 28 is threadably driven into the screw hole 26a-3 via the insertion hole 24d-1. At this time, the rear cover 26 can be attached while the supporters 10, which will be described later, are fitted into the attachment holes 27 of the frame 24. When the rear cover 26 is attached to the frame 24, the supporting piece 26a-2 of the rear cover 26 is arranged below the top plate 24b of the frame 24.

The rear cover 26 has a configuration in which the side plates 26a at both ends of the rear plate 26b are bent toward the front side. The rear plate 26b is slightly curved so as to bulge out in the middle toward the rear side. A plurality of supporting pieces 26b-1 are provided at the lower edge (as shown in the drawing) of the rear plate 26b. Each supporting piece 26b-1 is bent toward the front side along the bottom plate 24c of the frame 24. In each supporting piece 26b-1, there is provided a hole through which a screw (not shown in the drawings) designed to fix the supporting piece 26b-1 to the bottom plate 24c of the frame 24 is inserted.

At an upper end of the rear cover 26, there is provided a U-shaped attachment plate 29b designed to attach an LED unit 29a. The LED unit 29a is fixed to an upper surface of the attachment plate 29b by screws (not shown in the drawings). The attachment plate 29b is fixedly fastened to the supporting pieces 26a-2 of the side plates 26a of the rear cover 26 via screws (not shown in the drawings). When the rear cover 26 is attached to the frame 24, the LED unit 29a is covered almost entirely by the top plate 24b; however, a part of the LED unit 29a is exposed from a small gap between the lower surface of the top plate 24b of the frame 24 and the upper end of the rear plate 26b of the rear cover 26.

FIG. 3 is a cross-sectional view taken along the axial direction of the supporter 10, which is designed to mount the kick pad 20 on the stand 30, and FIG. 4 is an axially exploded perspective view of a plurality of structural members of the supporter 10. A part of the side plate 24d of the frame 24 and a part of the side plate 26a of the rear cover 26 of the kick pad 20 are shown in FIG. 3; however, the illustration thereof is omitted in FIG. 4. Hereinafter, an explanation will be given of the supporter 10 according to the present embodiment, with reference to FIGS. 3 to 4.

In the present embodiment, the kick pad 20 is mounted on the stand 30 using the four supporters 10. Specifically, each of the supporters 10 is attached via an attachment hole 32a provided close to an upper end of one of the two main frames 32 of the stand 30, and via another attachment hole 32b provided below the attachment hole 32a so as to be distanced therefrom. The upper attachment hole 32a is provided to penetrate a plate-like portion provided at the upper end of the main frame 32, and the lower attachment hole 32b is provided to penetrate the bottom of a concave portion 32c depressed in a direction intersecting with the axial direction of the main frame 32. Since the four supporters 10 have the same configuration, the supporter 10 attached to the attachment hole 32a closer to the upper end of one of the main frames 32 will be explained herein as an example.

The supporter 10 includes a sleeve bolt 11 that is inserted through an attachment hole 27 provided in the side plate 24d of the frame 24 of the kick pad 20, and a nut 12 that is threadably engageable with the sleeve bolt 11 and fixedly fastens the sleeve bolt 11 to the side plate 24d. The supporter 10 includes an impact-absorbing member (elastic member) 1 formed of solid rubber in a substantially columnar shape. The impact-absorbing member 1 is fixed to the main frame 32 of the stand 30 using a nut 2.

That is, the supporter 10 of the present embodiment fixes the kick pad 20 to one end of the supporter 10 as viewed in a direction (left-right direction as shown in FIG. 3) intersecting with the direction in which the kick pad 20 is beaten by the beater 51, and fixes the other end of the supporter 10 as viewed in the intersecting direction to the stand 30. In other words, in the present embodiment, the supporter 10 is not provided along the direction in which the kick pad 20 is beaten, but is provided in such an attitude that both of its ends are arranged along the direction intersecting with the direction of beating.

When the kick pad 20 is mounted on the stand 30 using the four supporters 10, four sleeve bolts 11 are fixed to the kick pad 20, and four impact-absorbing members 1 are fixed to the stand 30. The two main frames 32 of the stand 30 are inserted through two opening portions 25 of the frame 24 of the kick pad 20, in such a manner that all the sleeve bolts 11 and the impact-absorbing members 1 are coaxially arranged.

In this state, a key bolt 13 is inserted through each of the sleeve bolts 11, and is screwed into a fixing member 5 of the impact-absorbing member 1.

The impact-absorbing member 1 includes a fixing member 3 (second fixing member) designed to fix its right end (as shown in the drawing) (the other end) to the main frame 32. The fixing member 3 includes an approximately disc-shaped end plate 3a that is buried into the right end surface (as shown in the drawing) as viewed in the axial direction of the impact-absorbing member 1, and an axial portion 3b that is integrally provided to protrude from the right surface side (as shown in the drawing) at the center of the end plate 3a. The left surface (as shown in the drawing) and the outer peripheral surface of the end plate 3a are in contact with the impact-absorbing member 1. The end plate 3a is integrally formed with the impact-absorbing member 1 by means of, for example, thermal adhesion (vulcanized adhesion). The outer diameter of the end plate 3a is a size smaller than the outer diameter of the impact-absorbing member 1. The outer diameter of the end plate 3a is not limited thereto, and may be equal to or greater than the outer diameter of the impact-absorbing member 1.

The axial portion 3b has an outer diameter slightly smaller than the inner diameter of the attachment hole 32a, and a screw that is threadably engageable with the nut 2 is provided on the outer peripheral surface thereof. The length of the axial portion 3b is slightly longer than the value obtained by adding the length of the attachment hole 32a and the thickness of the nut 2. When the right end (as shown in the drawing) of the impact-absorbing member 1 is attached to an upper end of the main frame 32 via a fixing member 3, a part of the impact-absorbing member 1 that covers the outer peripheral surface of the end plate 3a is in contact with the plate-like portion of the main frame 32.

The impact-absorbing member 1 includes a fixing member 5 (first fixing member) designed to fix its left end (one end) (as shown in the drawing) to the kick pad 20. The fixing member 5 includes an end plate 5a that is approximately disc-shaped, and a nut portion 5b that is integrally provided to protrude from the right surface side (as shown in the drawing) of the end plate 5a at the center of the end plate 5a. The fixing member 5 is buried into the impact-absorbing member 1 in contact therewith, except for the left surface (as shown in the drawing) of the end plate 5a. The fixing member 5 is integrally formed with the impact-absorbing member 1 by means of, for example, heated adhesion (vulcanized adhesion). The outer diameter of the end plate 5a is a size smaller than the outer diameter of the impact-absorbing member 1. The outer diameter of the end plate 5a is not limited thereto, and may be equal to or greater than the outer diameter of the impact-absorbing member 1. The fixing member 5 includes a screw hole 5c that penetrates the end plate 5a and extends to a halfway portion of the nut portion 5b. In other words, the nut portion 5b includes a bottomed screw hole 5c.

The sleeve bolt 11 includes a head portion 11a that engages with an outer surface of the side plate 24d of the frame 24, and an axial portion 11b that is inserted through the attachment hole 27 of the side plate 24d. The outer diameter of the head portion 11a is larger than the inner diameter of the attachment hole 27. A screw that is threadably engageable with a nut 12 is provided on an outer peripheral surface of the axial portion 11b.

The sleeve bolt 11 includes an insertion hole 11c that axially penetrates its inside. A key bolt 13 is inserted through the insertion hole 11c. The key bolt 13 can be fastened using a tuning key (not shown in the drawings). The key bolt 13 has a length greater than the sleeve bolt 11, and is configured in such a manner that its distal end protrudes from a distal end of the axial portion 11b of the sleeve bolt 11 when the key bolt 13 is inserted through the insertion hole 11c with a washer 14 placed therebetween.

The key bolt 13 includes a head portion 13a with a diameter larger than the inner diameter of the insertion hole 11c of the sleeve bolt 11, and an axial portion 13b with a thickness that allows insertion through the insertion hole 11c. A screw that is threadably driven into a screw hole 5c of the fixing member 5 is provided on the outer peripheral surface of the axial portion 13b. The length of the axial portion 13b of the key bolt 13 is set to a length that allows a small gap to be formed between the distal end of the axial portion 13b and the bottom surface of the screw hole 5c of the nut portion 5b when the key bolt 13 is fully fastened to make the distal end of the axial portion 11b of the sleeve bolt 11 abut on the end plate 5a of the fixing member 5 (as in the state shown in FIG. 3).

When the left end (as shown in the drawing) of the impact-absorbing member 1 is attached to the kick pad 20, namely, when the kick pad 20 is mounted on the stand 30, the key bolt 13 is inserted through the insertion hole 11c of the sleeve bolt 11 via the washer 14, and the key bolt 13 is screwed into the screw hole 5c of the fixing member 5 at one end of the impact-absorbing member 1. The key bolt 13 is fastened until the distal end of the axial portion 11b of the sleeve bolt 11 abuts on the end plate 5a of the fixing member 5. In this state, the impact-absorbing member 1 is stretched in the left-right direction as shown in FIG. 3.

As described above, according to the present embodiment, since the kick pad 20 is mounted on the stand 30 via four supporters 10, instead of directly fixing the kick pad 20 to the stand 30, it is possible to suppress the impact sound generated when the kick pad 20 is beaten by the beater 51, and to make the rebound obtained when the kick pad 20 is beaten by the beater 51 a natural rebound similar to that of an acoustic drum. It is thus possible to improve the quietness required for an electronic drum, and to achieve a natural rebound similar to that as can be obtained by an acoustic drum, allowing the electronic drum to be played with a sensation closer to that of an acoustic drum.

In particular, since the supporter 10 of the present embodiment is attached in such an attitude that fixes the kick pad 20 to one end of the supporter 10 as viewed in a direction intersecting with the direction in which the kick pad 20 is beaten by the beater 51, and that fixes the other end of the supporter 10 to the stand 30, a lateral stress is applied to each of the supporters 10, and the impact-absorbing properties are further improved. If the supporters 10 were arranged along the direction of beating of the beater 51, a stress is applied to a direction that compresses the supporters 10, and the impact absorbing properties would be deteriorated. For example, instead of forming the impact-absorbing members 1 in a columnar shape, the impact-absorbing members 1 may be shaped so as to be narrow in the middle, in order to further improve the impact-absorbing properties. In other words, by suitably selecting the shape and material of the impact-absorbing members 1, it is also possible to provide supporters 10 with desired impact-absorbing properties.

The number of the supporters 10 is not limited to 4, and may be at least 2, or equal to or greater than 5. In either case, the preferable layout of the supporters 10 with respect to the kick pad 20 is to arrange a plurality of supporters 10 on both sides of the portion of the kick pad 20 to be beaten by the beater 51 as viewed in the horizontal direction, with the portion to be beaten interposed therebetween. By thus supporting the kick pad 20 from both ends of the portion to be beaten by the beater 51, it is possible to support the striking surface from both sides, and to obtain a striking sensation similar to that of a head of an acoustic drum.

In the present embodiment, since the supporters 10 are provided at two positions distanced from each other as viewed in the longer-side direction (up-down direction) of each of the main frames 32, and a striking point of the beater 51 is set within a region of a rectangle formed by using the four supporters 10 as the vertexes, it is possible to obtain a striking sensation closer to that of an acoustic drum. The stand 30 of the above-described embodiment may be equipped with a mechanism of adjusting the height of the kick pad 20, in such a manner that the height of the kick pad 20 is adjustable according to the position beaten by the beater 51.

According to the present embodiment, since the impact-absorbing members 1 arranged between the stand 30 and the kick pad 20 are attached while being stretched in its connection direction, the supporters 10 can be hardened compared to when the impact-absorbing members 1 are not stretched. That is, by attaching the impact-absorbing member 1 in a stretched state, it is possible to suppress the kick pad 20 from swaying relative to the stand 30 when the kick pad 20 is beaten by the beater 51, thus increasing the stiffness of the supporters 10. In other words, by changing the tightness of fastening of the key bolt 13 (i.e., the distance between the distal end of the sleeve bolt 11 and the fixing member 5), the degree of stretching of the impact-absorbing member 1 can be changed, and the rebound that is obtained when the kick pad 20 is beaten by the beater 51 can also be changed.

Since the impact-absorbing members 1 arranged between the stand 30 and the kick pad 20 are attached while being stretched in its connection direction, it is possible to prevent the problem of interference caused by contact between the kick pad 20 and the stand 30 when the kick pad 20 is mounted on the stand 30. That is, in the state before the key bolt 13 is fastened, the impact-absorbing member 1 attached to the stand 30 is loose and the length in the connection direction is short, compared to the state after the fastening. It is thus possible to prevent the problem of contact between the distal end of the axial portion 11b of the sleeve bolt 11 and the impact-absorbing member 1 at the time of mounting of the kick pad 20, thereby facilitating the mounting of the kick pad 20 on the stand 30.

The supporters 10 of the present embodiment support the kick pad 20 in a floating state with respect to the stand 30. That is, the kick pad 20 is mounted on the stand 30 via the side plates 24d of the frame 24, the sleeve bolts 11, the key bolts 13, the fixing members 5, the impact-absorbing members 1, and the fixing members 3. In other words, the supporters 10 of the present embodiment support the kick pad 20 in a floating state, in such a manner that the above-described members 24d, 11, 13, 5, 1, and 3 are not interfered by other peripheral members.

For example, the height of the attachment holes 27 with respect to the side plates 24d of the frame 24 is suitably set in such a manner that the upper end of the main frame 32 of the stand 30 does not interfere with the top plate 24b of the frame 24 of the kick pad 20. Also, the rear cover 26 includes a notch 26a-1 of a size that does not interfere with the supporters 10, in such a manner that the rear cover 26 does not contact the supporters 10. It is thereby possible to prevent the problem of contact between the kick pad 20 and the peripheral members, and to suppress generation of undesired impact sound.

Moreover, according to the present embodiment, since the impact sound can be made quieter and a natural rebound can be obtained by modifying the configuration and attitude of the supporters 10 designed to mount the kick pad 20 on the stand 30, it is possible to increase the flexibility in design of the kick pad 20 and the stand 30, without the need to take into account the shock absorbing properties of the kick pad 20 and the stand 30.

Additional advantages and modifications will readily occur to those skilled in the art. Therefore, the invention in its broader aspects is not limited to the specific details an d representative embodiment shown and described herein. Accordingly, various modifications may be made without departing from the spirit or scope of the general inventive concept as defined by the appended claims and their equivalents.

For example, in the above-described embodiment, a case has been explained where a rubber member is used as the impact-absorbing member 1 of the supporter 10 designed to mount the kick pad 20 on the stand 30; however, the impact-absorbing member 1 is not limited thereto, and other elastic members such as a coil spring or a leaf spring may be used as the impact-absorbing member 1. In either case, it is only required to attach the impact-absorbing member 1 in such an attitude that fixes one end as viewed in a direction intersecting with the direction of beating to the kick pad 20, and that fixes the other end as viewed in the direction intersecting with the direction of beating to the stand 30.

Furthermore, in the above-described embodiment, an explanation has been made with respect to the supporters 10 that support the kick pad 20 of an electronic drum on the stand 30; however, the present invention is not limited thereto, and may be applied to an apparatus that supports a drum pad not including a piezoelectric element.

The invention claimed is:

1. A supporter configured to attach a kick pad beaten with a beater to a stand installed on a floor surface, comprising:
an elastic member that fixes the kick pad to one end as viewed in a direction intersecting with a direction in which the kick pad is beaten by the beater, and that fixes the other end as viewed in the intersecting direction to the stand, wherein
the elastic member is formed of a solid rubber member, the solid rubber member having one and an opposite other end,
a first fixing member designed to fix the rubber member to the kick pad is provided at one end of the rubber member, and
a second fixing member designed to fix the rubber member to the stand is provided at the other end of the rubber member; and wherein
the rubber member is attached in such a state that the one end and the other end are stretched away from each other.

2. The supporter according to claim 1, wherein
a plurality of elastic members, each being the elastic member, are provided on both sides of a portion of the kick pad to be beaten by the beater as viewed in a horizontal direction, with the portion to be beaten interposed therebetween.

3. The supporter according to claim 1, wherein
a part of the other end of the rubber member is in contact with the stand.

4. A supporter comprising:
an elastic member including one end and an opposite other end, the elastic member extending in a direction intersecting with a direction of beating of a beater;
a first fixing member that fixes the one end of the elastic member to a kick pad; and
a second fixing member that fixes the other end of the elastic member to a stand; and wherein
a plurality of elastic members, each being the elastic member, are provided on both sides of a portion of the kick pad to be beaten by the beater as viewed in a horizontal direction, with the portion to be beaten interposed therebetween.

5. The supporter according to claim 4, wherein
the elastic member is formed of a solid rubber member.

6. The supporter according to claim 5, wherein
a part of the other end of the rubber member is in contact with the stand.

7. The supporter according to claim 5, wherein
the rubber member is attached in such a state that the one end and the other end are stretched away from each other.

8. Kick pad apparatus comprising:
a base;
first and second spaced apart upright support pipes, the first and second upright support pipes being connected at lower ends thereof to the base;
a kick pad;
a frame having side plates connected to the kick pad;
a first elastic damping member connected substantially horizontally between an outer side of the first pipe and the first plate of the kick pad frame; and
a second elastic damping member connected substantially horizontally to an outer side of the second pipe and the second plate of the kick pad frame.

9. The supporter of claim 1 which further includes:
at least one upright member having a lower end connected to the stand;
a frame for the kick pad; and
wherein the elastic member is connected substantially horizontally between an upper end of the upright member and the frame for the kick pad.

10. The supporter of claim 4 which further includes:
at least one upright member having a lower end connected to the stand;
a frame for the kick pad; and
wherein the elastic member is connected substantially horizontally between an upper end of the upright member and the frame for the kick pad.

11. The supporter of claim 9 wherein there are at least two spaced upright members, one of the upright members being connected to one side of the frame for the kick pad, with an other upright member being connected to an other side of the frame for the kick pad, and an elastic member being connected between the one upright member and the frame, with the other upright member being connected to another side of the frame with another elastic member.

12. The supporter of claim 10 wherein there are at least two spaced upright members, one of the upright members being connected to one side of the frame for the kick pad, with another upright member being connected to an other side of the frame for the kick pad, and an elastic member being connected between the one upright member and the frame, with the other upright member being connected to another side of the frame with another elastic member.

* * * * *